US008289846B2

(12) United States Patent
Baumgartner

(10) Patent No.: US 8,289,846 B2
(45) Date of Patent: Oct. 16, 2012

(54) STATISTICAL SUB-MULTIPLEXER FOR CENTRALLY FORMATTED BROADCAST PROGRAMMING

(75) Inventor: Frederick M. Baumgartner, Elizabeth, CO (US)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 12/565,540

(22) Filed: Sep. 23, 2009

(65) Prior Publication Data

US 2011/0069614 A1    Mar. 24, 2011

(51) Int. Cl.
*H04J 3/16* (2006.01)
(52) U.S. Cl. ............... 370/230; 370/468; 348/388.1
(58) Field of Classification Search ........ 370/229–230.1, 370/252, 329, 464, 465, 468, 477; 375/240.01; 348/384.1, 385.1, 388.1, 390.1
See application file for complete search history.

(56) References Cited

U.S. PATENT DOCUMENTS

| | | | | |
|---|---|---|---|---|
| 5,592,470 | A * | 1/1997 | Rudrapatna et al. | 370/468 |
| 5,991,292 | A * | 11/1999 | Focsaneanu et al. | 370/463 |
| 6,501,770 | B2 * | 12/2002 | Arsenault et al. | 370/477 |
| 7,236,738 | B2 * | 6/2007 | Settle | 455/3.01 |
| 7,593,433 | B1 | 9/2009 | Wu et al. | |
| 2003/0009765 | A1 * | 1/2003 | Linden et al. | 725/95 |
| 2009/0144792 | A1 | 6/2009 | Fielibert et al. | |

OTHER PUBLICATIONS

International Search Report—PCT/US2010/049880—International Search Authority, European Patent Office, Jan. 28, 2011 (090593WO).
Jae-Soo Cho, et al., "Effective application of statistical multiplexing in advanced T-DMB System", IEEE International Symposium on Industrial Electronics (ISIE); Jul. 5, 2009, pp. 297-300, XP031519192.
Qualcomm, "MediaFLO Technology overview", Feb. 2, 2009, pp. 1-23, XP002617156, Retrieved from the Internet : URL: http://www.qualcomm.com/documents/files/mediaflo-technology-overview.pdf [retrieved on Jan. 13, 2011].
Written Opinion—PCT/US2010/049880—ISA/EPO—Jan. 28, 2011 (090593W0).

* cited by examiner

*Primary Examiner* — Michael Thier
*Assistant Examiner* — Kerri Rose
(74) *Attorney, Agent, or Firm* — Ryan N. Farr

(57) ABSTRACT

Methods and systems generate a multiplex signal including two or more different sub-multiplexes for transmission via a broadcast network. A first sub-multiplex may include several services for broadcast in multiple locations, while multiple second sub-multiplexes may include services for broadcast within particular locations. A statistical multiplexer generates the first sub-multiplex within a first bandwidth allocation. If the first sub-multiplex services cannot fit within the allocated bandwidth, the bandwidth allocation may be adjusted. The statistical multiplexer may generate a second sub-multiplex within a second bandwidth allocation. If the second sub-multiplex services do not fit within the allocated bandwidth, the bandwidth allocation may be adjusted to increase the bandwidth allocated to the second sub-multiplex and decrease the bandwidth allocated to the first sub-multiplex so that the total bandwidth capacity of a broadcast network is not exceeded. This process may be repeated for each of the second sub multiplexes.

28 Claims, 6 Drawing Sheets

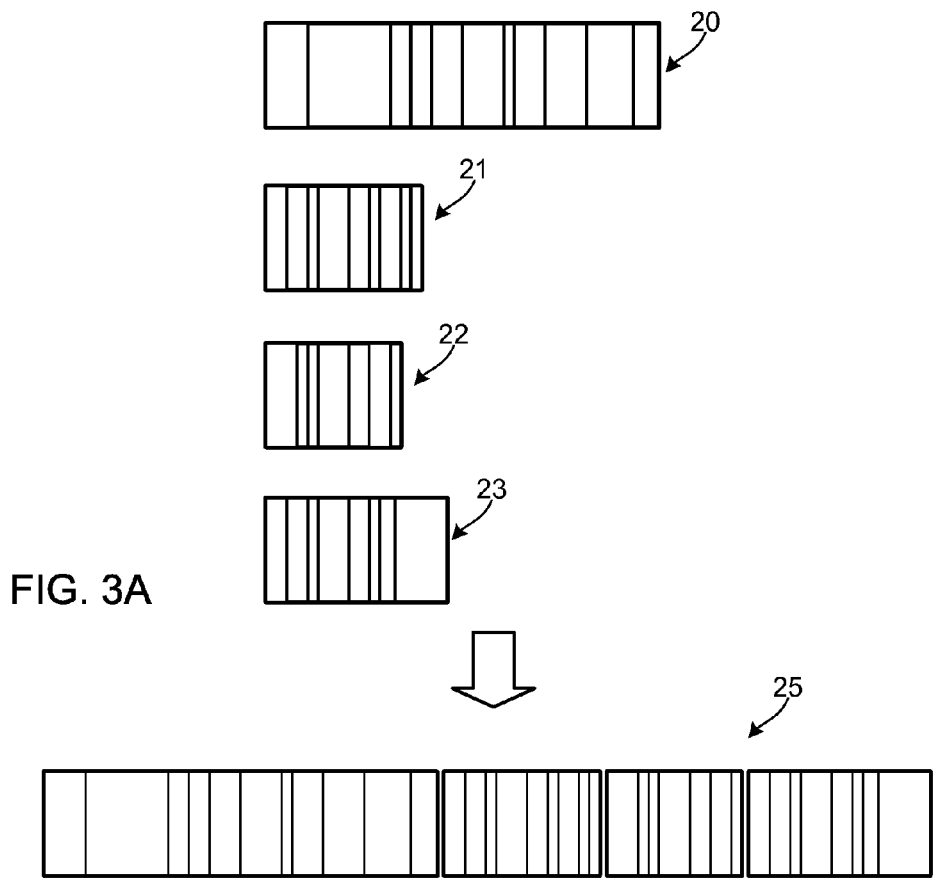
FIG. 3A
FIG. 3B
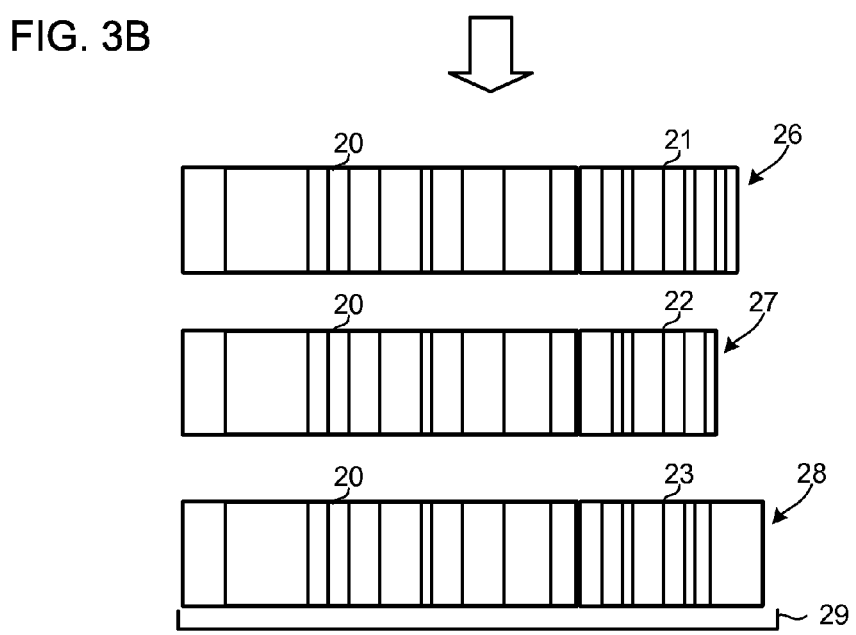
FIG. 3C

STATISTICAL SUB-MULTIPLEXER FOR CENTRALLY FORMATTED BROADCAST PROGRAMMING

BACKGROUND

Wireless communication technologies have seen explosive growth over the past few years. A recent addition to wireless communication technologies has been the ability to broadcast television to mobile users. Mobile broadcast users can view mobile editions of news, entertainment, sports, business, and other programming using their cell phone or other wireless devices. These broadcast systems have seen significant increase in usage and availability worldwide. Further growth in the deployment and services offered by mobile broadcast television-type networks is expected.

SUMMARY

The embodiment methods and systems enable the efficient generation of a multiplex signal for transmission via a broadcast network which includes two or more different sub-multiplexes. A first sub-multiplex may include a plurality of programs or services to be delivered to all local broadcast networks, while multiple second sub-multiplexes may include programs or services intended for broadcast only within particular local broadcast networks. A statistical multiplexer may generate the first sub-multiplex based upon a bandwidth allocation by compressing the service streams to fit within that allocation. If the services in the first sub-multiplex cannot fit within the allocated bandwidth, the bandwidth allocation may be adjusted to increase the amount allocated to the first sub-multiplex and decrease the amount of bandwidth allocated to the second sub-multiplex. The statistical multiplexer may then generate the second sub-multiplex based upon the allocated bandwidth. If the services in the second sub-multiplex cannot fit within the allocated bandwidth, the bandwidth allocation may be adjusted to increase the amount allocated to the second sub-multiplex and decrease the amount of bandwidth allocated to the first sub-multiplex, and the process of generating the first sub-multiplex may be repeated based on the new bandwidth allocation. This process may be repeated for each of the second sub-multiplexes until all of the second sub-multiplexes have been generated. In this manner, a central process can generate the first and second sub-multiplexes to support broadcast in a number of local broadcast networks, with bandwidth allocation being optimized across the full bandwidth. The various embodiments enable bandwidth sharing between the first and second sub-multiplexes without the total bandwidth of the first and second multiplexes exceeding the local broadcast bandwidth capacity. One application of the embodiments provides a first sub-multiplex for national broadcast (i.e., broadcast by most, if not all, local broadcast networks) and multiple sub-multiplexes of local broadcasts (i.e., broadcast only within a local broadcast network). In a further embodiment, more than two sub-multiplexes may be provided in the same manner, enabling national, regional, and local sub-multiplexes to be centrally generated and distributed to local broadcast networks. The various embodiments allow larger and thus more efficient statistical multiplexes in a communication environment in which defined sub-multiplexes are transmitted from a common aggregation and compression center and combined in defined patterns in the field for broadcast to end users.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIGS. 3A-3C are illustrations of national and local multiplexes as they are generated, transmitted to local broadcast networks and broadcast by local broadcast networks.

DETAILED DESCRIPTION

Figure 1:
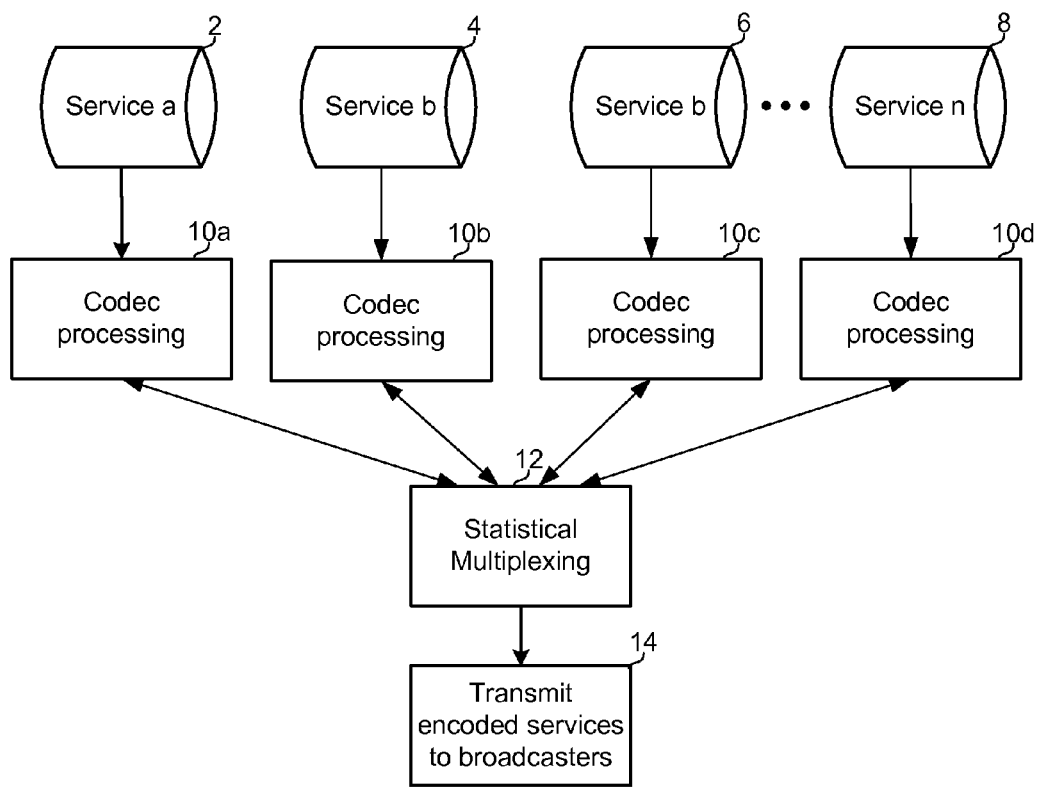
FIG. 1 is a process flow diagram of a conventional method for generating a multiplex signal for broadcast from a plurality of service feeds.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the term "services" applies to different streams of content, such as audio and video feeds, that may be included within a single broadcast signal, such as a mobile broadcast TV signal, or within a single transmission signal, such as a cable TV signal. Such services may be organized and accessible as if they were different broadcast "channels," but since the content may be multiplexed within a single signal of a single frequency band or complex of multiple frequency bands, the content is not on separate or distinct frequencies or channels per se. For example, the Media FLO mobile broadcast TV system broadcasts several "services," many of which correspond to programs of conventional television stations or broadcasters (e.g., ABC, CBS, NBC, etc.). Typically each service is provided by a different service provider which may be the producer or owner of the audio/video content making up the service.

As used herein, the terms "multiplex" and "multiplex signal" refer to a combined signal containing the data signals of a plurality of different services. In a particular example, a multiplex signal may be a combined signal containing multiple services that is formatted into a signal block or superframe for broadcast over a broadcast network, such as a MediaFLO network. As used herein, the terms "sub-multiplex" and "sub-multiplex signal" refer to a combined signal containing the data signals of a plurality of different services that may be combined with another sub-multiplex signal to form the multiplex signal that is broadcast over a broadcast network.

A number of different mobile broadcast television services and broadcast standards are available or contemplated in the future, all of which may implement and benefit from the various embodiments. Such services and standards include Open Mobile Alliance Mobile Broadcast Services Enabler Suite (OMA BCAST), MediaFLO, Digital Video Broadcast IP Datacasting (DVB-IPDC), and China Multimedia Mobile Broadcasting (CMMB).

While the various embodiments are described with reference to mobile broadcast television services, this is but one example of its potential applicability. The embodiments may also be utilized in cable television, over-the-air television broadcast networks, in satellite television networks and in any other communication system in which a plurality of communication services are aggregated in a central location and defined combinations of communication services are selected for broadcast to the end user. Thus, the references to mobile broadcast television technologies, such as MediaFLO, are not intended to limit the scope of the claims to such technologies unless specifically recited in a claim.

In some broadcast television technologies, such as MediaFLO, the signals suitable for broadcast by a local broadcast or distribution network are assembled in a single processing center. The processing center encodes the content feeds from various programs and services into the signal format of the local broadcast network. For example, in the case of mobile broadcast television technologies, program and service feeds are modified and encoded by a codec processor so that the services can be received and displayed on the small screens of mobile TV receivers (e.g., cellular telephones). This encoding of service feeds may include resizing images, configuring the data into the proper formats and packets for reception and processing by the mobile receivers, and compressing the video and audio information so that it requires less bandwidth (i.e., so it can be transmitted in fewer bits per second). The encoded program and service feeds are combined into a multiplexed signal that is suitable for broadcast. This multiplex signal may be transmitted to a local broadcast network or networks, which then broadcast the signal for reception by mobile receiver devices. Typically, a group of video and audio content streams are encoded and compressed to fit within the bandwidth capacity of the ultimate broadcast channel, i.e., the local broadcast network. To accomplish this generation of a multiplex signal from a plurality of services, a multiplexing process is employed which ensures that all services fit within the broadcast channel maximum bandwidth.

An efficient method for generating the multiplex signal for broadcast employs a statistical multiplexer that can take advantage of the continuously varying bandwidth requirements of the typical program and service streams. A statistical multiplexer allows a program or service stream that requires more bandwidth due to the amount of information in the signal to "borrow" bandwidth from other program or service streams that do not require as much bandwidth at any given moment. Should the total bandwidth requested by all of the encoded services exceed the distribution channel's bandwidth capacity, the statistical multiplexer requests one or more codec processors to re-encode the service at a lower bit-rate, temporarily sacrificing some quality in the re-encoded program streams. Selectively re-encoding program streams in an intelligent manner allows the broadcast system to maximize the number of program streams that can be supported by a given data channel.

Because the bandwidth of each program stream continuously varies, dropping and adding program streams downstream from the processing center, where the statistical multiplexer generates the initial multiplex, is complicated. Any inserted (added) program stream or streams must have less bandwidth than the (dropped) program stream(s) being replaced. However, the bandwidth required by and allocated to a particular program stream varies from instant to instant (such as from each one-second superframe to the next in MediaFLO), so more bandwidth must be dropped than can be added to ensure that the total bandwidth restrictions are not violated. This can be problematic in situations where there is inadequate bandwidth to accomplish the drop-add with reasonable quality. As demand for mobile television services increases, it is anticipated that maximizing the utilization of the broadcast bandwidth will become a priority in broadcast systems.

A conventional process for creating a multiplex signal for broadcast that includes a number of services is illustrated in FIG. 1. Audio and video content feeds from a number of different programs or services a, b, c, n are provided to the broadcast center, step 2, 4, 6, 8, where the services are encoded, compressed and formatted in one or a plurality of codec processes, step 10a, 10b, 10c, 10d. In their normal format, the service audio/video feeds may each represent several megabytes per second worth of information, which the codec processing compresses down to a much smaller information stream in a format suitable for transmission to the target receiver. For example, in the case of the Media FLO mobile broadcast TV technology, a program service which may average 8 MB per second in unprocessed form may be compressed in the codec processing 10a, 10b, 10c, 10d into a stream of information in the range of about 100 kilobits per second at a minimum, to about 450 kilobits per second at a maximum. As is well known, transmitting audio and video content in encoded signals that contain more information (i.e., bits per second) will result in better received image and sound quality at the expense of transmission bandwidth. Decreasing the information content of a broadcast service stream allows more services to be carried within the same total bandwidth, but at the expense of audio/video quality.

To ensure that all of the encoded service feeds can be transmitted within the bandwidth of the system transmitter, the total bandwidth required by all of the encoded service feeds is calculated and compared to the available transmission bandwidth in a statistical multiplexing process, step 12. For example, in the MediaFLO system, the broadcast channel has a maximum bandwidth of approximately 5 Mb per second, so the total required bandwidth of all encoded services within the multiplex signal must be equal to or less than 5 Mb per second. If the total bandwidth of all encoded services exceeds the available bandwidth of the system transmitter, the statistical multiplexing process 12 may select one or more services for further re-encoding by the codec processing 10a, 10b, 10c, 10d to increase the data compression and request re-encoding of that selected service. In doing so the statistical multiplexer may communicate instructions back to the encoder or codec processor defining how deeply to compress, or re-encode the selected service. A variety of methods, including statistical methods, may be used for selecting particular services for further compression. For example, services may be ordered in terms of a priority such that the service with the lowest priority is selected for further compression first, while higher priority services are afforded the best broadcast quality (i.e., allowed to have highest signal bandwidth, and thus the lowest degree of compression). As another example, the amount of data compression may be applied approximately equally to all services or to all low priority services so that no one service is compressed to the lowest level in a discriminatory manner.

The process of re-encoding a selected service feed to further compress the encoded file by re-performing the codec processing 10a, 10b, 10c, 10d, calculating the total required signal bandwidth, selecting a service for re-encoding, and instructing the encoder or codec regarding how deeply to compress or re-encode the selected service continues until the total required signal bandwidth for all encoded services will fit within the system transmitter's bandwidth. At this point, the encoded multiplexed services are transmitted to one or more broadcast networks for broadcasting, step 14. This multiplexing process then repeats for another broadcast unit, such as a superframe.

This process of encoding services and statistically multiplexing a plurality of services to fit within the available transmitter bandwidth is repeated for every broadcast unit for the particular system. For example, the MediaFLO system transmits the multiplex signal in a superframe that is one second in duration, so the encoding and statistical multiplexing process is repeated for every one second of MediaFLO broadcast content. Other broadcast systems may perform the process more frequently, such as once every image frame (which may be between 24 and 30 times per second) or once for every group of image frames. Repeating the encoding and statistical multiplexing process frequently is useful because the information content in typical audio and video services changes very frequently depending upon the varying nature of the content from instant to instant. For example, the information content in the video portion of a movie will change rapidly based upon the nature of the image (i.e., scenes with little movement or edges, such as snow fields or walls, have low information content, whereas rapidly changing scenes, such as crowds or explosions, have higher information content). Similarly, the information content in the audio portion of a service will fluctuate greatly depending upon the nature of the sound, such as dropping dramatically during periods of little or no sound.

Statistical multiplexing enables more services to be carried within the fixed amount of transmission bandwidth by taking advantage of the peaks and valleys in required bandwidth that occur in most broadcast programs. While one service may require greater bandwidth to transmit the video and sound image of an action scene, such as an explosion, at that same instant other services may require only average or lower amounts of bandwidth. For example, a service that requires a large amount of bandwidth to convey the images and sounds of an explosion in one second may require much less bandwidth to convey the stillness following the explosion in the next second. Statistical multiplexing provides for better overall user experience of a mobile TV broadcast because it enables services that temporarily require more bandwidth for acceptable video quality to borrow bandwidth from services that temporarily require less bandwidth. Thus, by performing the statistical multiplexing process across several services, a better fit of the data compression to the particular requirements of each service can be accomplished.

Figure 2:
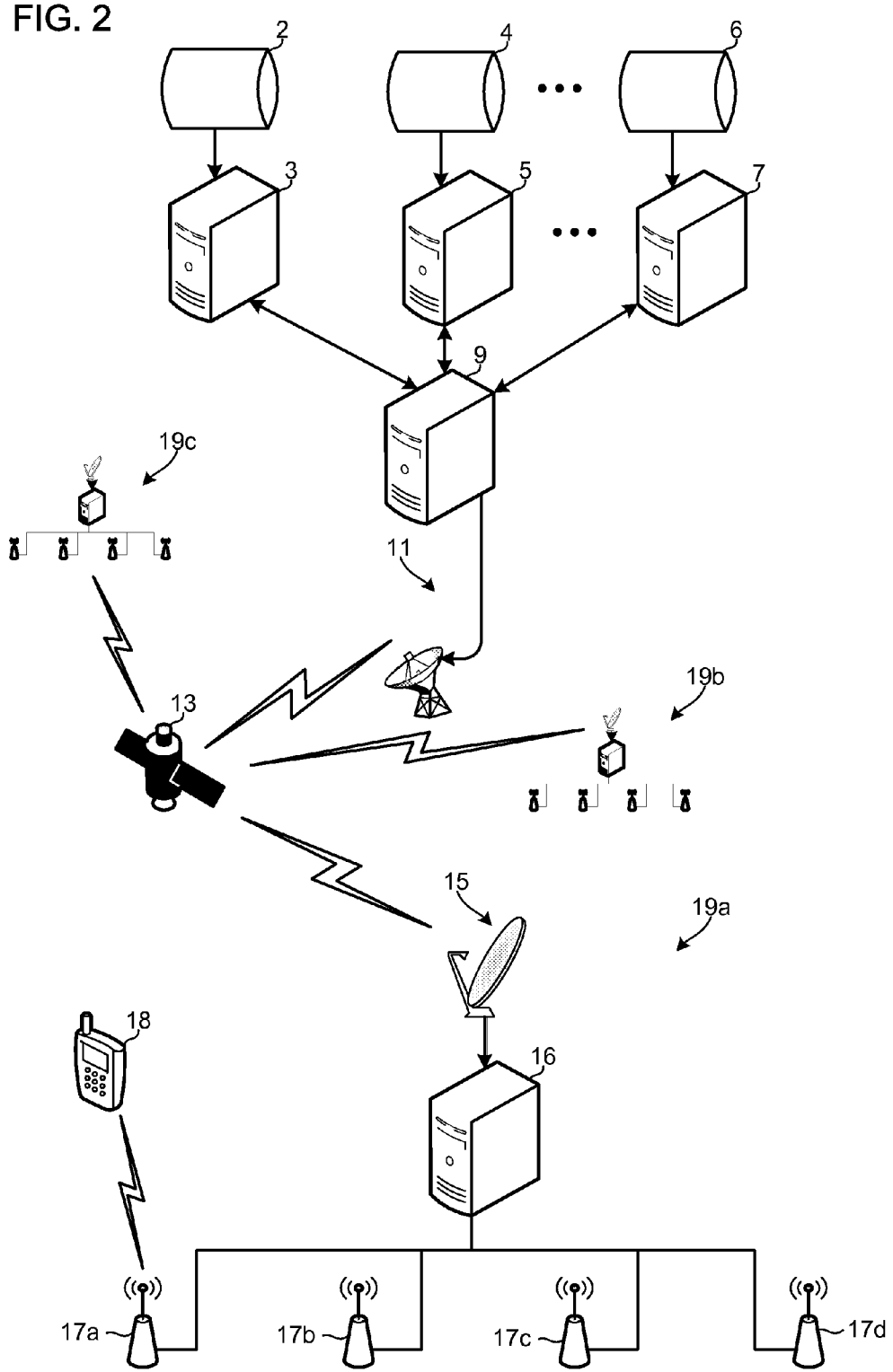
FIG. 2 is a system block diagram of a broadcast communication system suitable for use with the various embodiments.

A portion of the communication system architecture for a mobile TV broadcast system, such as Media FLO, that may implement the various embodiments is illustrated in FIG. 2. A plurality of services for broadcast over the system may be received from a variety of data sources 2, 4, 6, such as large capacity data storage systems, Internet websites, content producer servers, and tangible storage media (e.g., DVD or videotape). The audio/video feeds of each service are processed in a codec processor 3, 5, 7, which may be a server or computer configured with software instructions to accomplish the codec process described above with reference to FIG. 1. The codec processing and computers capable of performing such processing are well-known in the video broadcast and electronic communication arts. Results of the codec processing are provided to the statistical multiplexing processor 9, which may be a commercially available server or computer configured with software instructions to accomplish the statistical multiplexing processes of the various embodiments. The multiplex signal including all of the services for broadcast may be provided to a satellite ground station 11 which relays the multiplex signal via a communication satellite 13 to ground station receivers 15 associated with each of local broadcast networks 19a, 19b, 19c. The local broadcast networks receive the multiplex signal in a broadcaster system 16, which distributes the signal to each of a plurality of transmission antennas 17a, 17b, 17c, 17d. The multiplex signal broadcast from the transmission antennas 17a, 17b, 17c, 17d can be received by mobile devices 18, which are configured with electronics and software to receive and process the signal in order to display a particular one of the plurality of services to the user. Typically, local broadcast networks 19a, 19b, 19c will be geographically dispersed with a single network serving a large metropolitan area, such as Boston, Los Angeles, New York, and Washington D.C.

The communication system illustrated in FIG. 2 enables a single statistical multiplexing processor 9 to create a multiplex signal that includes sub-multiplexes which can be broadcast in a plurality of different local markets. Accomplishing the single multiplexing process in a central location provides economies of scale, while enabling the statistical multiplexing process to be accomplished over a large number of service feeds in multiple sub-multiplexes.

A particular challenge for the communication network architecture illustrated in FIG. 2 arises when each of the local broadcast networks 19a, 19b, 19c desire to carry local content of services which are not broadcast by any of the other local networks (i.e., location-specific services). For example, cable television systems offer subscribers access to national as well as local television stations, so consumers are used to receiving both national and local feeds. In order for mobile TV broadcasters to compete with other video content delivery technologies, it is anticipated that there will be a need for supporting local programming within the communication network architecture illustrated in FIG. 2.

One approach for supporting local programming within the communication network architecture illustrated in FIG. 2 is to allocate a set amount of bandwidth to the national service content and a fixed amount of bandwidth for the local programming services. With fixed preset bandwidth allocations for the national and local content, a central statistical multiplexer can perform the processing described above with reference to FIG. 1 to fit the national content into the fixed national bandwidth allocation and to fit each of the local contents into the fixed local bandwidth allocation. The local broadcast network server 16 then selects the national content signal feed and the appropriate local content signal feed from the signal feeds received from the satellite 13 to create the local broadcast signal relayed to the broadcast antennas 17a-17d. This approach may be disadvantageous because from time to time the local programming services will exceed their allocated bandwidth, which will result in unacceptable degradation of one or more of the local services. Such degradation may occur even when the total bandwidth used by the national programming services do not use all of the bandwidth allocated to national programming. Thus, while one or more local programming services are unacceptably degraded, the full available broadcast bandwidth is not being utilized.

Another approach for supporting local programming within the communication network architecture illustrated in FIG. 2 would be to provide a dedicated statistical multiplexing processor 9 for each local broadcast network 19a, 19b, 19c so that separate, locally-customized multiplex signals including both the national content and local broadcast content can be provided to each local network. While this approach enables delivery of local as well as national content to each local broadcast network in a multiplex service that takes full advantage of the available bandwidth, redundant computer resources and processing are required, which increases the cost and complexity of the communication network.

The various embodiments provide an economical and efficient system for providing different encoded broadcast content for each of a plurality of local broadcast networks by enabling statistical multiplex processing over both national and local content. As a result, a common national multiplex signal can be combined with separate local multiplex signals so that the combination of the national multiplex and any one local multiplex will fit within the bandwidth of a local broadcast network. In overview, statistical multiplexing is performed over both the national and local content in a manner that enables trade-offs in bandwidth allocations to be accomplished to bandwidth requirements of national and local service content without exceeding the bandwidth capacity of any local broadcast network. The national content is processed in a statistical multiplexer 9 to generate a national sub-multiplex encoded signal. Each service intended for a local broadcast (i.e., it will only be broadcast in some, but not all, local broadcast networks) is also processed by the statistical multiplexer 9 to provide a local sub-multiplex of local services. If the national services content requires additional bandwidth that originally allocated, such as to accommodate one or more programs or services that require better image resolution (or otherwise require more bandwidth), such bandwidth may be borrowed from the local broadcast sub-multiplex bandwidth allocation. Each of the local service contents are statistically multiplexed so that each local sub-multiplex fits within the new bandwidth allocation. In this manner, the national sub-multiplex can be made larger and the local sub-multiplex can be reduced in size. If a local content requires additional bandwidth to accommodate a program that requires greater signal fidelity, bandwidth may be borrowed from the national content package if such bandwidth is available. The various embodiments allow larger, and thus more efficient, statistical multiplexes in a communication environment in which defined sub-multiplexes are transmitted from a common aggregation and compression center and combined in defined patterns in the field for broadcast to end users.

Methods for combining a national multiplex of services and a number of local multiplexes of services into a combined multiplex that can be broadcast from a local broadcast network is graphically illustrated in FIGS. 3A-3C. Referring to FIG. 3A, within a particular time slot, such as a one-second broadcast superframe as in the case of MediaFLO, the statistical multiplexing process is performed to create a sub-multiplex of national service content 20 and a local content sub-multiplex 21, 22, 23 for each local broadcast network. As illustrated, each service within a sub-multiplex may be encoded and compressed to require a different amount of bandwidth (e.g., between about 100 and about 450 kilobits/second). The statistical multiplexing processes is performed over the national service feeds, and again over the local content service feeds, to produce national and local sub-multiplexes that optimize the use of the total transmission bandwidth to meet the transmission requirements of each of the broadcast services, while ensuring that the total bandwidth for each local broadcast network does not exceed the broadcast capacity. Methods for accomplishing the statistical multiplexing across national and local services groups are described more fully below with reference to FIGS. 4 and 5.

Referring to FIG. 3B, when the statistical multiplexing processing has been completed for a particular block of time or superframe, the encoded national and local sub-multiplexes may be combined into a transmission frame 25 for transmission to all of the local broadcast networks via a satellite 13, fiber optic (not shown), or other high-capacity communication link. As illustrated, the sub-multiplex data may be concatenated into a single transmission frame 25, which can be received and unpacked by each local broadcast network. The local broadcast network assembles the appropriate combination of the national sub-multiplex 20 and its local sub-multiplex 21, 22, 23 into a single multiplex signal for broadcasting. This is illustrated in FIG. 3C, which shows three separate local network broadcast multiplexes 26, 27, 28 (i.e., one for each of three different local broadcast networks), each comprising the national content sub-multiplex 20 and a corresponding appropriate local content sub-multiplex 21, 22, 23. The total bandwidth of the combination of the national content sub-multiplex 20 and local content sub-multiplex 21, 22, 23 does not exceed the total bandwidth of the local broadcast networks which is illustrated by the bracket 29.

Figure 4:
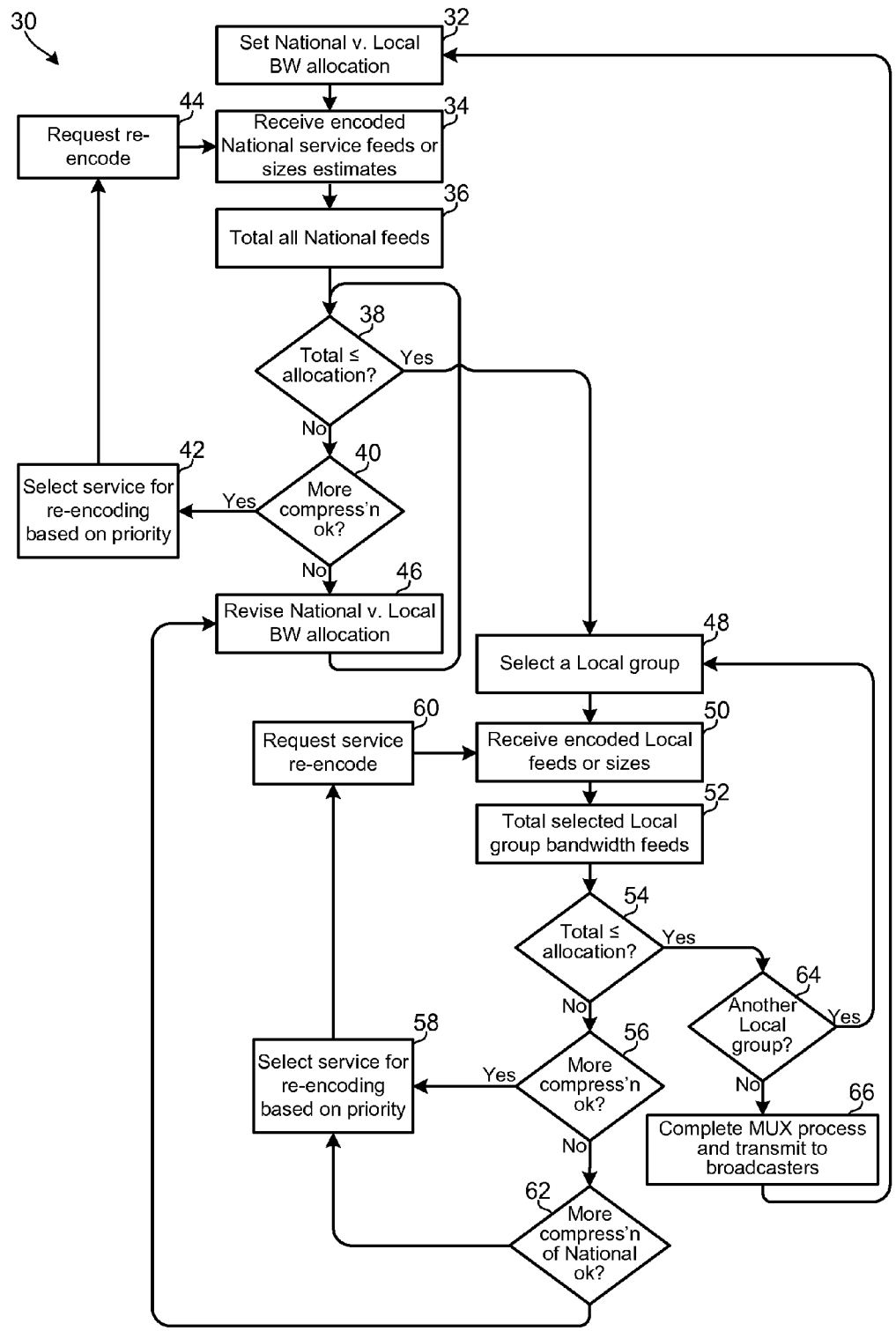
FIG. 4 is a process flow diagram of an embodiment method for generating national and local broadcast multiplexes.

An example embodiment for accomplishing the statistical multiplexing of both national and local sub-multiplexes is illustrated in FIG. 4 which shows a multiplexing process 30. At the start of the multiplex process 30 for each broadcast time increment (e.g., the next one-second superframe in the case of MediaFLO signals), the processing center system may set a bandwidth allocation for each of the national and local sub-multiplexes, step 32. This allocation of bandwidth between the two groups of content may be arbitrarily set, such as 60%/40%, based upon average bandwidth requirements for the two sub-multiplexes for the particular time of the broadcast superframe, or based upon the bandwidth allocation used in the prior time segment. The bandwidth allocations may be provided to the codec processors 3, 5, 7, which encode the next block of national content feeds that are provided to the statistical multiplexer, step 34. In an alternative embodiment described below, instead of the encoded feeds being provided to the statistical multiplexer, only the bandwidth sizes of each of the encoded national service feeds may be passed to the statistical multiplexer. The statistical multiplexer totals the bandwidth required by each of the encoded national feeds, step 36, and determines whether the total bandwidth is less than or equal to the bandwidth allocated to the national sub-multiplex in step 32.

If the total bandwidth is less than the national sub-multiplex bandwidth allocation (i.e., determination 38="Yes"), the statistical multiplexer may begin the multiplexing processing of the local services by moving to step 48 as described below. On the other hand, if the total bandwidth of the encoded national feeds exceeds the national sub-multiplex bandwidth allocation (i.e., determination 38="No"), the statistical multiplexer may determine whether additional compression of the national feeds is acceptable without exceeding the desired maximum level of compression, determination 40. This determination may depend upon whether any re-encoding of national content feeds has been performed on the services in the particular time block or superframe and the bandwidth required by each of the content services within the national sub-multiplex.

If additional compression of at least one national service feed is acceptable (i.e., the compression can be accomplished without exceeding the desired maximum level of compression) (i.e., determination 40="Yes"), the statistical multiplexer may select a particular service for re-encoding based upon a prioritization algorithm, step 42. For example, the statistical multiplexer may select a particular program or service known to have lower priority for signal quality. As another example, the statistical multiplexer may select a program or service for re-encoding based upon its type of content, such as selecting content types that typically have low bandwidth requirements (e.g., news interview programs, talk shows and cartoons). As a further example, the statistical multiplexer may select for re-encoding programs and services which have not been previously re-encoded within the particular time block or superframe.

The service or services selected for re-encoding are identified to the appropriate codec processor in a request for re-encoding, step 44. This request for re-encoding may also specify a degree of compression or a target bandwidth (BPS). The re-encoded signal data are received from the codec processors, step 34, and the total bandwidth required for all of the encoded national service feeds is recalculated, step 36, so the statistical multiplexer can determine whether the national sub-multiplex bandwidth is less than or equal to the national bandwidth allocation, determination 38. This process of totaling bandwidth requirements and requesting re-encoding of particular services if necessary continues until the total bandwidth required by the national sub-multiplex is within the national allocation (i.e., determination 38="Yes"), or no further compression can be accomplished (i.e., determination 40="No").

If no further compression of the national content services is possible without unacceptably degrading one or more services (i.e., without exceeding the desired maximum level of compression) (i.e., determination 40="No"), the statistical multiplexer may revise the bandwidth allocated to the national sub-multiplex to borrow bandwidth from the local sub-multiplex allocation, step 46. This step may borrow just enough bandwidth from the local content allocation to accommodate the total national sub-multiplex bandwidth after the processing of steps 34 through 44 have accomplished the maximum allowable compression.

At this point, the statistical multiplexer may begin processing each of the local groups of services in a similar manner. A particular local broadcast group of services is selected for processing, step 48, and the encoded local service feeds are received from the codec processors, step 50. The statistical multiplexer totals the bandwidth required for all of the encoded local service feeds, step 52, and determines whether the total bandwidth of the local encoded feeds exceeds local sub-multiplex bandwidth allocation established in either steps 32 or 48, determination 54. If the total bandwidth required by the encoded selected local group of services exceeds the local sub-multiplex bandwidth allocation (i.e., determination 54="No"), the statistical multiplexer may determine whether any of the local services can be further compressed without exceeding the desired maximum level of compression, determination 56. If one or more of the selected local services can be further compressed without exceeding the desired maximum level of compression (i.e., determination 56="Yes"), the statistical multiplexer may select a particular service for re-encoding based on its priority, step 58. As described above with respect to national service feeds, the statistical multiplexer may select one or more services for re-encoding based upon its priority or the nature of the content itself. The service or services selected for re-encoding are identified to the appropriate codec processor, step 60, which performs the requested re-encoding and provides the re-encoded service data to the statistical multiplexer, step 50. The statistical multiplexer then re-totals the bandwidth required for the encoded local content service feeds, step 52 and determines again whether the total bandwidth is less than or equal to the local sub-multiplex bandwidth allocation, determination 54. This process of re-encoding selected local services continues until the total bandwidth of the encoded local services is less than the local sub-multiplex bandwidth allocation (i.e., determination 54="Yes") or until no further compression is acceptable for the local content (i.e. determination 56="No").

If the statistical multiplexer determines that the group of services in the selected local broadcast group cannot be further compressed without degrading the reception quality of one or more services (i.e., without exceeding the desired maximum level of compression), (i.e., determination 56="No"), the statistical multiplexer may determine whether the national sub-multiplex group can be further compressed without degrading its reception quality, determination 62. This determination may be accomplished in the same manner as determination 40 described above, or may be accomplished by setting a flag in determination 40 if further compression is not permitted, and checking this flag in determination 62. If further compression of services within the national sub-multiplex is possible, the statistical multiplexer may adjust the national/local bandwidth allocation to borrow bandwidth from the national sub-multiplex to provide it to the local sub-multiplexes, step 46. With the bandwidth allocation adjusted for the national sub-multiplex, the statistical multiplexer may return to determination 38 to determine whether the total bandwidth of the encoded services within the national sub-multiplex exceeds the new national sub-multiplex bandwidth allocation. The statistical multiplexer continues with processing of the national sub-multiplex as described above until the national sub-multiplex fits within the new bandwidth allocation (i.e., determination 38="Yes"). At that point, the statistical multiplexer returns to processing the selected local content group, step 48, and continues processing to determine whether the total of the encoded selected local group services fits within the new local group sub-multiplex bandwidth allocation, determination 54. If further compression of the national sub-multiplex is not possible, however, the statistical multiplexer may select another local service for further compression below the normally acceptable level in order to fit the total bandwidth of both the national and local sub-multiplexes within the maximum bandwidth of the local broadcast network, step 58.

Once the local content bandwidth is less than or equal to the bandwidth allocated to the local content (i.e. determination 54="Yes"), the statistical multiplexer may determine whether there is another local broadcast group of services to be multiplexed, determination 64. If there is another local broadcast group be processed (i.e., determination 64="Yes"), the statistical multiplexer selects the next group for processing, step 48, and proceeds as described above. Once all local groups of services have been encoded (i.e., determination 64="No"), the statistical multiplexer completes the process of preparing the local and national sub-multiplexes, and forms a transmission unit containing both the local and national sub-multiplexes for transmission to each of the local broadcast networks via a satellite or other communication system, step 66. At this point, the statistical multiplexing process repeats by returning to step 32 to allocate bandwidth between the local and national sub-multiplexes for encoding and multiplexing the next block of broadcast content.

Figure 5:
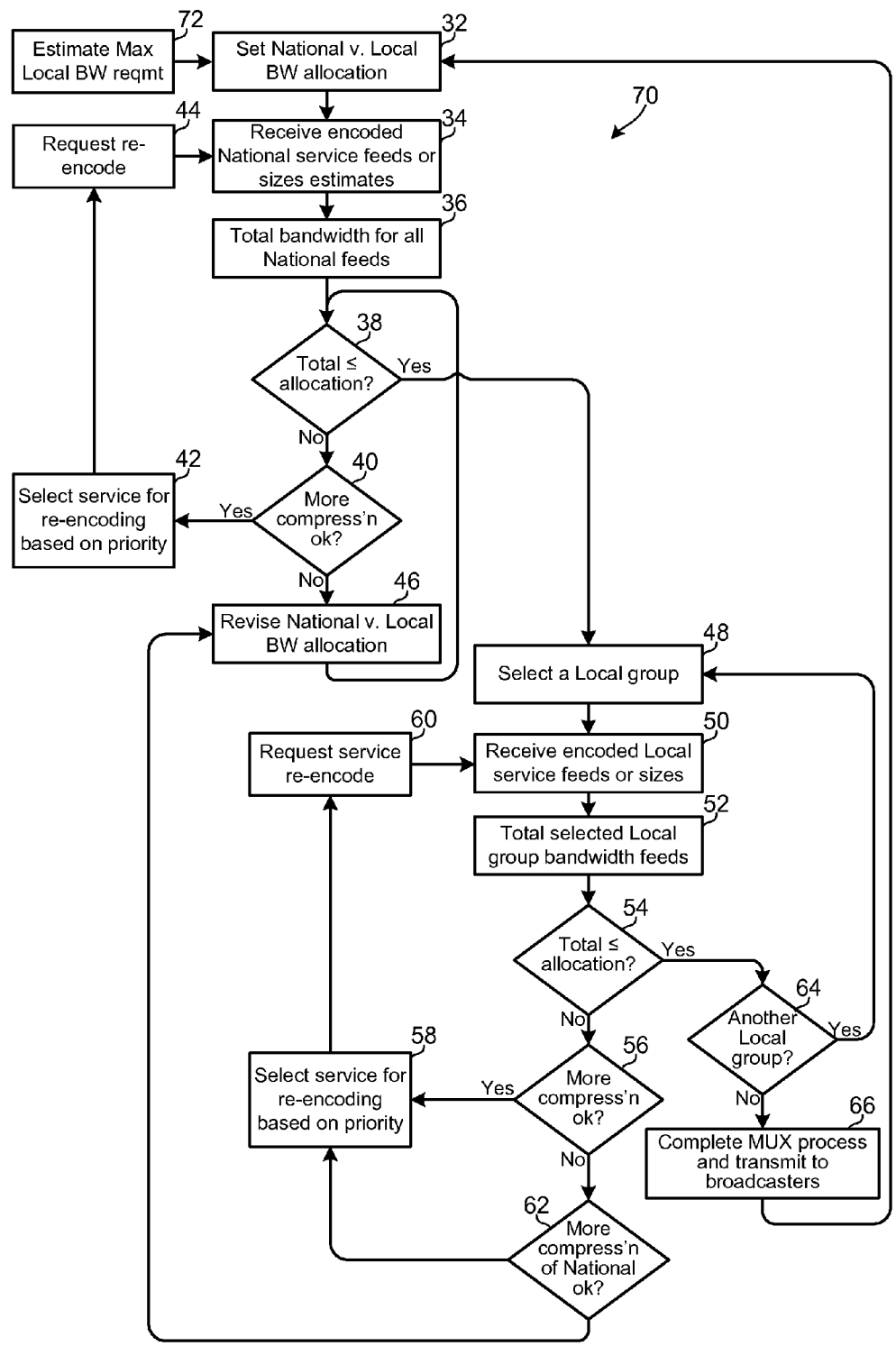
FIG. 5 is a process flow diagram of another embodiment method for generating national and local broadcast multiplexes.

An alternate embodiment is illustrated in FIG. 5 which shows a process 70 for preparing a centralized encoded multiplex signal including a common national sub-multiplex and multiple local-specific sub-multiplexes. The method 70 is similar to the method 30 described above with reference to FIG. 4 with the exception that the bandwidth allocation between the national and local sub-multiplexes determined in one time interval is used to estimate the bandwidth allocations for the next time interval, step 72. In this embodiment the rest of the processing proceeds as described above with reference to FIG. 4 for like numbered steps. Using the estimated national versus local sub-multiplex bandwidth allocations to generate subsequent encoded and multiplexed signals in step 72 enables the system to learn from the bandwidth allocation decisions made by the statistical multiplexer based on current service streams. This may be advantageous because if a local broadcast sub-multiplex group includes a program that requires a large amount of bandwidth, such as a local sports program, that demand for bandwidth is likely to carry over from second to second (at least between commercial breaks). Thus, the overall process may be streamlined by enabling the statistical multiplexer to estimate the local versus national sub-multiplex bandwidth allocations based at least in part on information gained from a previous encoding and multiplexing step. Otherwise the statistical multiplexer may need to adjust the national versus local sub-multiplex bandwidth allocations, step 46, in every encoded time segment. This embodiment may also require setting the sub-multiplex bandwidth allocations to a default allocation from time to time, essentially periodically repeating step 32 in FIG. 4.

While the various embodiments have been described with respect to a system allocating transmission bandwidth between a set of national programs or service feeds (i.e., a national sub-multiplex) and particular local broadcaster programs or service feeds (i.e., local sub-multiplexes), the various embodiments may be used with other allocations of broadcast bandwidth. For example, the methods may be used to allocate bandwidth among the three or more different sub-multiplexes, such as a national sub-multiplex (i.e., a sub-multiplex of services broadcast all local broadcast networks), regional sub-multiplexes (i.e., sub-multiplexes of services broadcast in some but not all local broadcast networks) and local sub-multiplexes (i.e., sub-multiplexes services broadcast solely in a single local broadcast network).

In a further embodiment, the decisions regarding further encoding of selected services to fit sub-multiplexes within bandwidth allocated to the national and local sub-multiplexes groups may be based upon estimated bandwidth requirements that are received before the services are encoded by the codec processors. Processing in this alternative embodiment proceeds in a manner very similar to that illustrated in FIGS. 4 and 5, with the exception that bandwidth size estimates for each service are reported to the statistical multiplexer in determination steps 38, 50 so the statistical multiplexer can inform the codec processors of the amount of encoding to be performed on each service feed before the encoding process begins. In this embodiment, each service feed time block (e.g., the next second's worth of the service content) is evaluated to estimate its likely bandwidth requirement after encoding, with the estimated bandwidth sizes provided to the statistical multiplexer in steps 34, 50. The statistical multiplexer can use the estimated service feed sizes to calculate a total estimated required bandwidth for either the national or local sub-multiplexes, steps 36, 52. The processes illustrated in FIGS. 4 and 5 then continue as described above, except that instead of requesting re-encoding of selected services in steps 44, 60, the statistical multiplexer increases the level of encoding that will be applied to the selected service. Once the statistical multiplexer determines that the estimated total signal bandwidth will fit within the sub-multiplex group bandwidth allocations (i.e., determinations 38 and 54="Yes"), the degree of encoding assigned to each service is then used by the codec processors to generate the encoded service feeds which the statistical multiplexer combines into the national or local sub-multiplexes. By determining the amount of encoding required on each service in order to fit national and local service feeds within broadcast bandwidth limitations as a first step, this embodiment enables the codec encoding of all services to be accomplished in a single step.

By forming statistical multiplex groups around each desired sub-multiplex, and controlling the bandwidth of the encoded service signals generated by the codec processors for each of several statistical multiplexer groups, a single large multiplex can more efficiently serve a number of sub-multiplexes. The multiplexing formula is simple: the sum of the bandwidth required by each sub-group multiplex cannot exceed the desired channel bandwidth for that sub-multiplex. The embodiment methods reduce the bandwidth and equipment that would be required to generate a separate complete multiplex without sub-multiplexes by one-half with a bandwidth allocation efficiency approaching that possible with a singular method.

Figure 6:
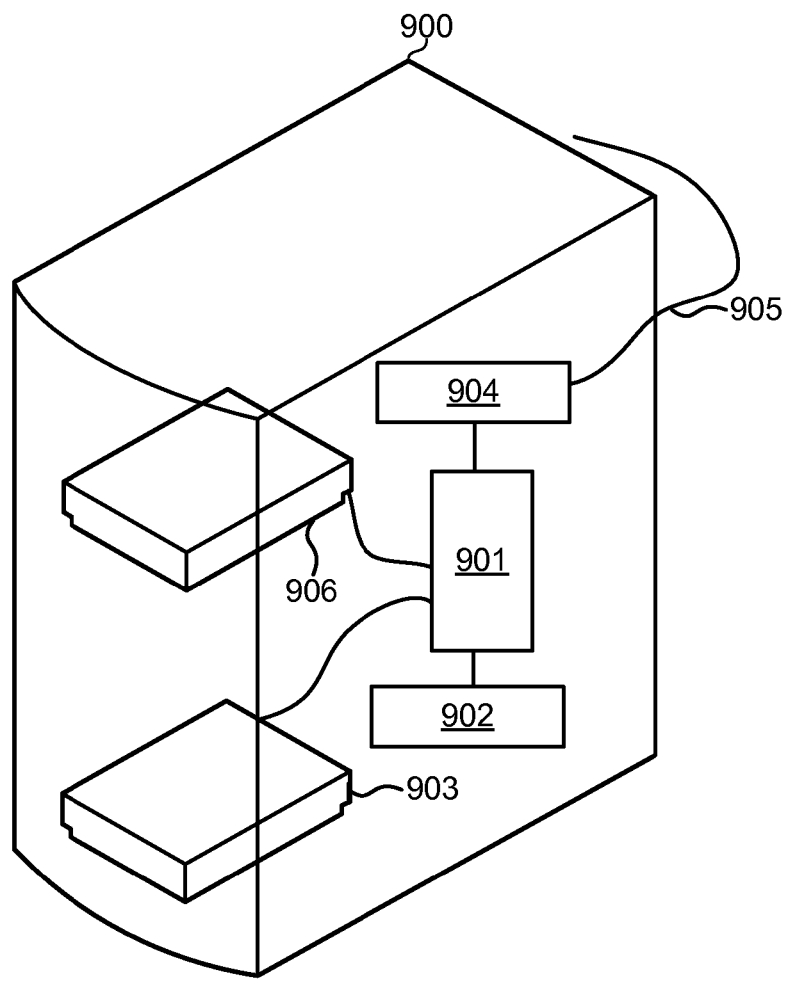
FIG. 6 is a component block diagram of a computer suitable for accomplishing the various embodiment methods.

The codec processor and statistical multiplexer may be implemented utilizing any of a variety of general purpose computers, such as the computer 900 illustrated in FIG. 6. Such a computer 900 typically includes a processor 901 coupled to volatile memory 902 and a large capacity nonvolatile memory, such as a disk drive 903. The computer 900 may also include a floppy disc drive and/or a compact disc (CD) drive 906, or other electronic data readers/writers (e.g., memory card readers), coupled to the processor 901. The computer 900 may also include network access ports 904 coupled to the processor 901 for communicating with a network 905, such as to access signal measurement data on disk drive 906. The computer 900 may further include user input devices, such as a keyboard and mouse (not shown), and output devices, such as a printer and/or display (not shown).

The processors 901 in the computer 900 may be any programmable microprocessor, microcomputer or multiple processor chip or chips that can be configured by software instructions (applications) to perform a variety of functions, including the functions of the various embodiments described herein. Typically, software applications may be stored in the internal memory (e.g. volatile memory 902 or disc drive 903) before they are accessed and loaded into the processor 901.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for centrally generating a multiplex signal for broadcast from a plurality of local broadcast networks, comprising:
   setting a bandwidth allocation for a national services sub-multiplex and a bandwidth allocation for local services sub-multiplexes such that a total of the bandwidth allocated to the national services sub-multiplex and the bandwidth allocated to the local services sub-multiplexes does not exceed a maximum bandwidth capacity of any one of the plurality of local broadcast networks;
   determining a bandwidth required for each service to be included in the national services sub-multiplex;
   determining whether a total of the determined bandwidth required for each service to be included in the national services sub-multiplex exceeds the bandwidth allocated to the national services sub-multiplex;
   determining whether one or more of the services to be included in the national services sub-multiplex can be further compressed if the total of the determined bandwidth required for each service to be included in the national services sub-multiplex will exceed the bandwidth allocated to the national services sub-multiplex;
   increasing compression of one or more of the services to be included in the national services sub-multiplex if it is determined that one or more of the services to be included in the national services sub-multiplex can be further compressed; and
   increasing the bandwidth allocated to the national services sub-multiplex and decreasing the bandwidth allocated to the local services sub-multiplexes if it is determined that one or more of the services to be included in the national services sub-multiplex cannot be further compressed, wherein a total of the increased bandwidth allocated to the national services sub-multiplex and the decreased bandwidth allocated to the local services sub-multiplexes does not exceed the maximum bandwidth capacity of any one of the plurality of local broadcast networks.

2. The method of claim 1, further comprising:
   determining a bandwidth required for each service to be included within one of the local services sub-multiplexes;
   determining whether a total of the determined bandwidth required for each service to be included in the one of the local services sub-multiplexes exceeds the bandwidth allocated to the local services sub-multiplexes;
   determining whether one or more of the services to be included in the one of the local services sub-multiplexes can be further compressed if the total of the determined bandwidth required for each service to be included in the one of the local services sub-multiplexes will exceed the bandwidth allocated to the local services sub-multiplexes;
   increasing compression of one or more of the services to be included in the one of the local services sub-multiplexes if it is determined that one or more of the services to be included in the one of the local services sub-multiplexes can be further compressed; and
   increasing the bandwidth allocated to the local services sub-multiplexes and decreasing the bandwidth allocated to the national services sub-multiplex if it is determined that one or more of the services to be included in the one of the local services sub-multiplexes cannot be further compressed, wherein a total of the decreased bandwidth allocated to the national services sub-multiplex and the increased bandwidth allocated to the local services sub-multiplexes does not exceed the maximum bandwidth capacity of any one of the plurality of local broadcast networks.

3. The method of claim 2, wherein:
determining a bandwidth required for each service comprises encoding the service for broadcast and determining a bandwidth required by the encoded service; and
increasing compression of one or more of the services comprises re-encoding the one or more of the services so as to increase an amount of data compression.

4. The method of claim 2, wherein:
determining a bandwidth required for each service comprises estimating a bandwidth that will be required by the service when it is encoded for broadcast; and
increasing compression of one or more of the services comprises increasing an amount of data compression to a be applied when the one or more services is encoded for broadcast.

5. The method of claim 2, further comprising:
selecting one or more one or more of the services to be included in the one of the local services sub-multiplexes for further compression beyond a desired maximum level of compression if it is determined that the total of the determined bandwidth required for each service to be included in the one of the local services sub-multiplexes will exceed the bandwidth allocated to the local services sub-multiplexes, that one or more of the services to be included in the national services sub-multiplex cannot be further compressed, and that one or more of the services to be included in the national services sub-multiplex can be further compressed without exceeding the desired maximum level of compression.

6. The method of claim 5, further comprising:
generating the national services sub-multiplex and each of the local services sub-multiplexes when it is determine that the total of the determined bandwidth required for each service to be included in the national sub-multiplex will not exceed the bandwidth allocated to the national services sub-multiplex, and that each total of the determined bandwidth required for each service to be included in each of the local sub-multiplexes will not exceed the bandwidth allocated to the local services sub-multiplexes.

7. The method of claim 1, wherein setting a bandwidth allocation for a national services sub-multiplex and a bandwidth allocation for local services sub-multiplexes comprises setting the bandwidth allocations based upon bandwidth allocations determined in a previous time interval.

8. A computer of a broadcast system that centrally generates a multiplex signal for broadcast from a plurality of local broadcast networks, the computer comprising:
a processor; and
a network access port coupled to the processor and configured to enable the processor to communicate with a network of the broadcast system,
wherein the processor is configured with processor-executable instructions to perform steps comprising:
setting a bandwidth allocation for a national services sub-multiplex and a bandwidth allocation for local services sub-multiplexes such that a total of the bandwidth allocated to the national services sub-multiplex and the bandwidth allocated to the local services sub-multiplexes does not exceed a maximum bandwidth capacity of any one of the plurality of local broadcast networks;
determining a bandwidth required for each service to be included in the national services sub-multiplex;
determining whether a total of the determined bandwidth required for each service to be included in the national services sub-multiplex exceeds the bandwidth allocated to the national services sub-multiplex;
determining whether one or more of the services to be included in the national services sub-multiplex can be further compressed if the total of the determined bandwidth required for each service to be included in the national services sub-multiplex will exceed the bandwidth allocated to the national services sub-multiplex;
directing a codec processor of the broadcast system to increase compression of one or more of the services to be included in the national services sub-multiplex if it is determined that one or more of the services to be included in the national services sub-multiplex can be further compressed; and
increasing the bandwidth allocated to the national services sub-multiplex and decreasing the bandwidth allocated to the local services sub-multiplexes if it is determined that one or more of the services to be included in the national services sub-multiplex cannot be further compressed, wherein a total of the increased bandwidth allocated to the national services sub-multiplex and the decreased bandwidth allocated to the local services sub-multiplexes does not exceed the maximum bandwidth capacity of any one of the plurality of local broadcast networks.

9. The computer of claim 8, wherein the computer is configured with processor-executable instructions to perform steps further comprising:
determining a bandwidth required for each service to be included within one of the local services sub-multiplexes;
determining whether a total of the determined bandwidth required for each service to be included in the one of the local services sub-multiplexes exceeds the bandwidth allocated to the local services sub-multiplexes;
determining whether one or more of the services to be included in the one of the local services sub-multiplexes can be further compressed if the total of the determined bandwidth required for each service to be included in the one of the local services sub-multiplexes will exceed the bandwidth allocated to the local services sub-multiplexes;
directing the codec processor of the broadcast system to increase compression of one or more of the services to be included in the one of the local services sub-multiplexes if it is determined that one or more of the services to be included in the one of the local services sub-multiplexes can be further compressed; and
increasing the bandwidth allocated to the local services sub-multiplexes and decreasing the bandwidth allocated to the national services sub-multiplex if it is determined that one or more of the services to be included in the one of the local services sub-multiplexes cannot be further compressed, wherein a total of the decreased bandwidth allocated to the national services sub-multiplex and the increased bandwidth allocated to the local services sub-multiplexes does not exceed the maximum bandwidth capacity of any one of the plurality of local broadcast networks.

10. The computer of claim 9, wherein the computer is configured with processor-executable instructions such that:
  determining a bandwidth required for each service comprises encoding the service for broadcast and determining a bandwidth required by the encoded service; and
  directing the codec processor of the broadcast system to increase compression of one or more of the services comprises directing the codec processor to re-encode the one or more of the services so as to increase an amount of data compression.

11. The computer of claim 9, wherein the computer is configured with processor-executable instructions such that:
  determining a bandwidth required for each service comprises estimating a bandwidth that will be required by the service when it is encoded for broadcast; and
  directing the codec processor of the broadcast system to increase compression of one or more of the services comprises directing the codec processor to increase an amount of data compression to a be applied when the one or more services is encoded for broadcast.

12. The computer of claim 9, wherein the computer is configured with processor-executable instructions to perform steps further comprising:
  selecting one or more one or more of the services to be included in the one of the local services sub-multiplexes for further compression beyond a desired maximum level of compression if it is determined that the total of the determined bandwidth required for each service to be included in the one of the local services sub-multiplexes will exceed the bandwidth allocated to the local services sub-multiplexes, that one or more of the services to be included in the national services sub-multiplex cannot be further compressed, and that one or more of the services to be included in the national services sub-multiplex can be further compressed without exceeding the desired maximum level of compression.

13. The computer of claim 12, wherein the computer is configured with processor-executable instructions to perform steps further comprising:
  generating the national services sub-multiplex and each of the local services sub-multiplexes when it is determine that the total of the determined bandwidth required for each service to be included in the national sub-multiplex will not exceed the bandwidth allocated to the national services sub-multiplex, and that each total of the determined bandwidth required for each service to be included in each of the local sub-multiplexes will not exceed the bandwidth allocated to the local services sub-multiplexes.

14. The computer of claim 8, wherein the computer is configured with processor-executable instructions such that setting a bandwidth allocation for a national services sub-multiplex and a bandwidth allocation for local services sub-multiplexes comprises setting the bandwidth allocations based upon bandwidth allocations determined in a previous time interval.

15. A computer system for a broadcast system, the computer system comprising:
  a processor configured with processor-executable instructions to perform steps comprising:
    setting a bandwidth allocation for a national services sub-multiplex and a bandwidth allocation for local services sub-multiplexes such that a total of the bandwidth allocated to the national services sub-multiplex and the bandwidth allocated to the local services sub-multiplexes does not exceed a maximum bandwidth capacity of any one of the plurality of local broadcast networks;
    determining a bandwidth required for each service to be included in the national services sub-multiplex;
    determining whether a total of the determined bandwidth required for each service to be included in the national services sub-multiplex exceeds the bandwidth allocated to the national services sub-multiplex;
    determining whether one or more of the services to be included in the national services sub-multiplex can be further compressed if the total of the determined bandwidth required for each service to be included in the national services sub-multiplex will exceed the bandwidth allocated to the national services sub-multiplex;
    increasing compression of one or more of the services to be included in the national services sub-multiplex if it is determined that one or more of the services to be included in the national services sub-multiplex can be further compressed; and
    increasing the bandwidth allocated to the national services sub-multiplex and decreasing the bandwidth allocated to the local services sub-multiplexes if it is determined that one or more of the services to be included in the national services sub-multiplex cannot be further compressed, wherein a total of the increased bandwidth allocated to the national services sub-multiplex and the decreased bandwidth allocated to the local services sub-multiplexes does not exceed the maximum bandwidth capacity of any one of the plurality of local broadcast networks.

16. The computer system of claim 15, wherein the processor is configured with processor-executable instructions to perform steps further comprising:
  determining a bandwidth required for each service to be included within one of the local services sub-multiplexes;
  determining whether a total of the determined bandwidth required for each service to be included in the one of the local services sub-multiplexes exceeds the bandwidth allocated to the local services sub-multiplexes;
  determining whether one or more of the services to be included in the one of the local services sub-multiplexes can be further compressed if the total of the determined bandwidth required for each service to be included in the one of the local services sub-multiplexes will exceed the bandwidth allocated to the local services sub-multiplexes;
  increasing compression of one or more of the services to be included in the one of the local services sub-multiplexes if it is determined that one or more of the services to be included in the one of the local services sub-multiplexes can be further compressed; and
  increasing the bandwidth allocated to the local services sub-multiplexes and decreasing the bandwidth allocated to the national services sub-multiplex if it is determined that one or more of the services to be included in the one of the local services sub-multiplexes cannot be further compressed, wherein a total of the decreased bandwidth allocated to the national services sub-multiplex and the increased bandwidth allocated to the local services sub-multiplexes does not exceed the maximum bandwidth capacity of any one of the plurality of local broadcast networks.

17. The computer system of claim 16, wherein:
  determining a bandwidth required for each service comprises encoding the service for broadcast and determining a bandwidth required by the encoded service; and
  increasing compression of one or more of the services comprises re encoding the one or more of the services so as to increase an amount of data compression.

18. The computer system of claim 16, wherein:
  determining a bandwidth required for each service comprises estimating a bandwidth that will be required by the service when it is encoded for broadcast; and
  increasing compression of one or more of the services comprises increasing an amount of data compression to a be applied when the one or more services is encoded for broadcast.

19. The computer system of claim 16, wherein the processor is configured with processor-executable instructions to perform steps further comprising:
  selecting one or more one or more of the services to be included in the one of the local services sub-multiplexes for further compression beyond a desired maximum level of compression if it is determined that the total of the determined bandwidth required for each service to be included in the one of the local services sub-multiplexes will exceed the bandwidth allocated to the local services sub-multiplexes, that one or more of the services to be included in the national services sub-multiplex cannot be further compressed, and that one or more of the services to be included in the national services sub-multiplex can be further compressed without exceeding the desired maximum level of compression.

20. The computer system of claim 19, wherein the processor is configured with processor-executable instructions to perform steps further comprising:
  generating the national services sub-multiplex and each of the local services sub-multiplexes when it is determine that the total of the determined bandwidth required for each service to be included in the national sub-multiplex will not exceed the bandwidth allocated to the national services sub-multiplex, and that each total of the determined bandwidth required for each service to be included in each of the local sub-multiplexes will not exceed the bandwidth allocated to the local services sub-multiplexes.

21. The computer system of claim 15, wherein setting a bandwidth allocation for a national services sub-multiplex and a bandwidth allocation for local services sub-multiplexes comprises setting the bandwidth allocations based upon bandwidth allocations determined in a previous time interval.

22. A computer program product, comprising:
  a non-transitory computer-readable storage medium comprising:
    at least one instruction for setting a bandwidth allocation for a national services sub-multiplex and a bandwidth allocation for local services sub-multiplexes such that a total of the bandwidth allocated to the national services sub-multiplex and the bandwidth allocated to the local services sub-multiplexes does not exceed a maximum bandwidth capacity of any one of the plurality of local broadcast networks;
    at least one instruction for determining a bandwidth required for each service to be included in the national services sub-multiplex;
    at least one instruction for determining whether a total of the determined bandwidth required for each service to be included in the national services sub-multiplex exceeds the bandwidth allocated to the national services sub-multiplex;
    at least one instruction for determining whether one or more of the services to be included in the national services sub-multiplex can be further compressed if the total of the determined bandwidth required for each service to be included in the national services sub-multiplex will exceed the bandwidth allocated to the national services sub-multiplex;
    at least one instruction for increasing compression of one or more of the services to be included in the national services sub-multiplex if it is determined that one or more of the services to be included in the national services sub-multiplex can be further compressed; and
    at least one instruction for increasing the bandwidth allocated to the national services sub-multiplex and decreasing the bandwidth allocated to the local services sub-multiplexes if it is determined that one or more of the services to be included in the national services sub-multiplex cannot be further compressed, wherein a total of the increased bandwidth allocated to the national services sub-multiplex and the decreased bandwidth allocated to the local services sub-multiplexes does not exceed the maximum bandwidth capacity of any one of the plurality of local broadcast networks.

23. The computer program product of claim 22, wherein the non-transitory computer-readable storage medium further comprises:
  at least one instruction for determining a bandwidth required for each service to be included within one of the local services sub-multiplexes;
  at least one instruction for determining whether a total of the determined bandwidth required for each service to be included in the one of the local services sub-multiplexes exceeds the bandwidth allocated to the local services sub-multiplexes;
  at least one instruction for determining whether one or more of the services to be included in the one of the local services sub-multiplexes can be further compressed if the total of the determined bandwidth required for each service to be included in the one of the local services sub-multiplexes will exceed the bandwidth allocated to the local services sub-multiplexes;
  at least one instruction for increasing compression of one or more of the services to be included in the one of the local services sub-multiplexes if it is determined that one or more of the services to be included in the one of the local services sub-multiplexes can be further compressed; and
  at least one instruction for increasing the bandwidth allocated to the local services sub-multiplexes and decreasing the bandwidth allocated to the national services sub-multiplex if it is determined that one or more of the services to be included in the one of the local services sub-multiplexes cannot be further compressed, wherein a total of the decreased bandwidth allocated to the national services sub-multiplex and the increased bandwidth allocated to the local services sub-multiplexes does not exceed the maximum bandwidth capacity of any one of the plurality of local broadcast networks.

24. The computer program product of claim 23, wherein:
  the at least one instruction for determining a bandwidth required for each service comprises at least one instruction for encoding the service for broadcast and determining a bandwidth required by the encoded service; and the at least one instruction for increasing compression of one or more of the services comprises at least one instruction for re-encoding the one or more of the services so as to increase an amount of data compression.

25. The computer program product of claim 23, wherein:

the at least one instruction for determining a bandwidth required for each service comprises at least one instruction for estimating a bandwidth that will be required by the service when it is encoded for broadcast; and the at least one instruction for increasing compression of one or more of the services comprises at least one instruction for increasing an amount of data compression to a be applied when the one or more services is encoded for broadcast.

26. The computer program product of claim 23, wherein the non-transitory computer-readable storage medium further comprises:

at least one instruction for selecting one or more of the services to be included in the one of the local services sub-multiplexes for further compression beyond a desired maximum level of compression if it is determined that the total of the determined bandwidth required for each service to be included in the one of the local services sub-multiplexes will exceed the bandwidth allocated to the local services sub-multiplexes, that one or more of the services to be included in the national services sub-multiplex cannot be further compressed, and that one or more of the services to be included in the national services sub-multiplex can be further compressed without exceeding the desired maximum level of compression.

27. The computer program product of claim 26, wherein the non-transitory computer-readable storage medium further comprises:

at least one instruction for generating the national services sub-multiplex and each of the local services sub-multiplexes when it is determine that the total of the determined bandwidth required for each service to be included in the national sub-multiplex will not exceed the bandwidth allocated to the national services sub-multiplex, and that each total of the determined bandwidth required for each service to be included in each of the local sub-multiplexes will not exceed the bandwidth allocated to the local services sub-multiplexes.

28. The computer program product of claim 22, wherein the at least one instruction for setting a bandwidth allocation for a national services sub-multiplex and a bandwidth allocation for local services sub-multiplexes comprises at least one instruction for setting the bandwidth allocations based upon bandwidth allocations determined in a previous time interval.

* * * * *